Sept. 20, 1960 H. A. BENZEL 2,952,853
MEANS FOR DETACHABLY ATTACHING A LENS TO A FACE MASK
Filed June 26, 1956 3 Sheets-Sheet 1

INVENTOR.
Howard A. Benzel
BY
Walter H. Popp.
Attorney.

Sept. 20, 1960 H. A. BENZEL 2,952,853
MEANS FOR DETACHABLY ATTACHING A LENS TO A FACE MASK
Filed June 26, 1956 3 Sheets-Sheet 2
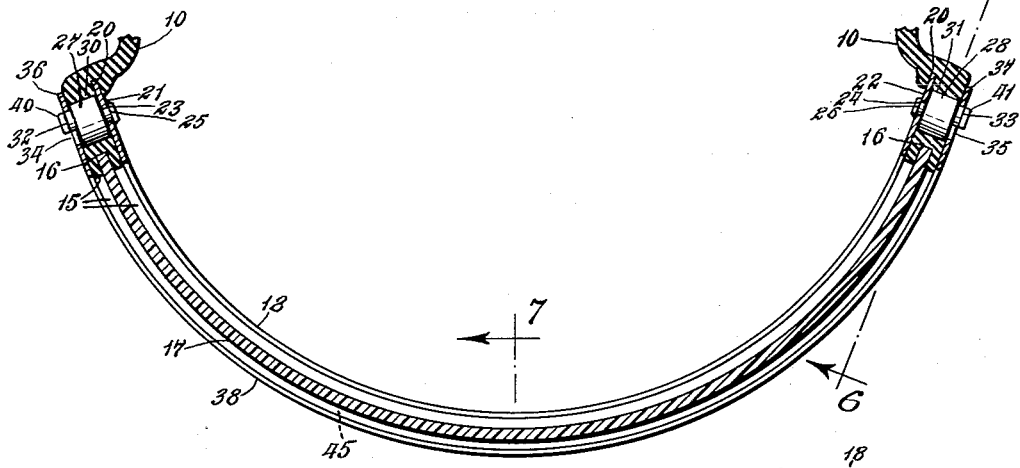
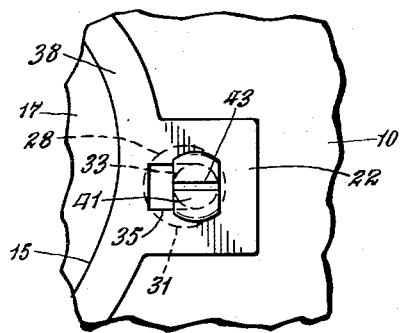
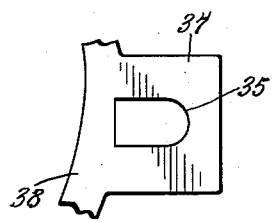
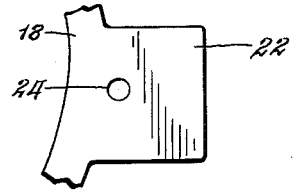
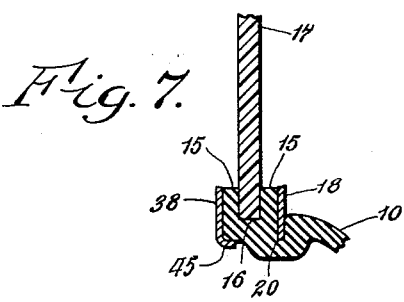
INVENTOR.
Howard A. Benzel
BY
Walter H. Popp.
Attorney.

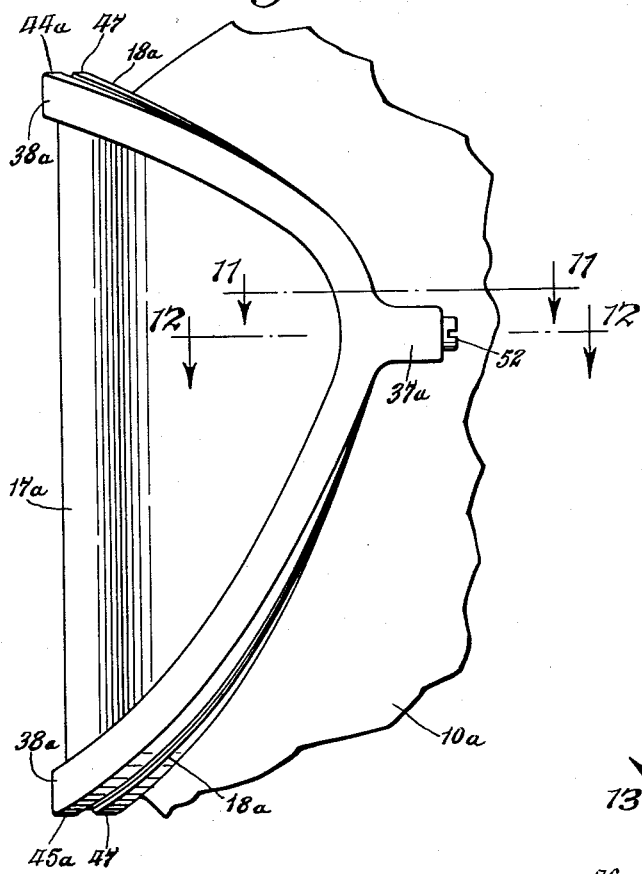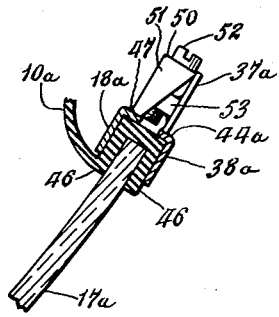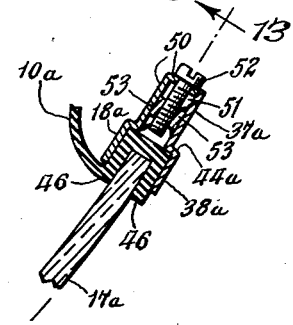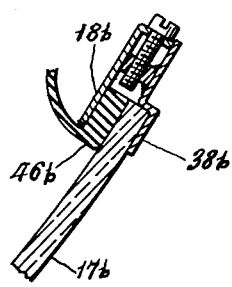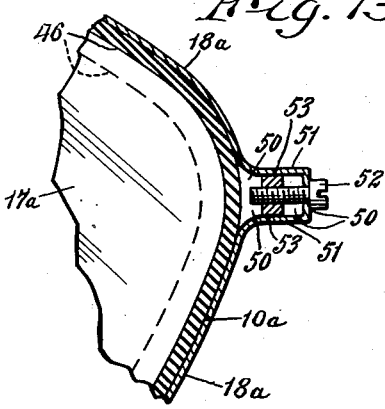
INVENTOR.
Howard A. Benzel
BY Walter H. Popp.
Attorney.

United States Patent Office 2,952,853
Patented Sept. 20, 1960

2,952,853

MEANS FOR DETACHABLY ATTACHING A LENS TO A FACE MASK

Howard A. Benzel, Lancaster, N.Y., assignor to Scott Aviation Corporation, Lancaster, N.Y., a corporation of New York Filed June 26, 1956, Ser. No. 593,890

2 Claims. (Cl. 2—14)

This invention relates to a face mask having a curvilinear lens, and relates more particularly to a means for detachably attaching said curvilinear lens to the main body of the face mask. The mask may be of the full-face type or be of the type which covers the eyes only, and may be a mask for employment at or near the surface of the earth, or under water, or at very high altitudes.

The principal object of the invention is to provide a simple, inexpensive and fluid-tight means of detachably attaching such a curvilinear lens to a mask body. Other objects of the invention and practical solutions thereof are disclosed in the following detailed description and in the appended drawings, wherein:

Fig. 4 is a fragmentary horizontal section thru said mask, taken on line 4—4 Fig. 1.

Fig. 5 is a fragmentary, enlarged, side elevation of one end of the lens attaching means, taken approximately along the line 6—6 Fig. 4.

Fig. 6 is a fragmentary, enlarged, vertical section thru one end of said lens attaching means, taken on line 6—6 Fig. 4.

Fig. 7 is a fragmentary, enlarged, vertical section thru the lower part of the mask, taken on line 7—7 Fig. 4.

Fig. 8 is an enlarged, side elevation of one end of the tension band 38.

Fig. 9 is an enlarged, side elevation of one end of the backing plate 18.

Fig. 10 is a fragmentary, side elevation (similar to Fig. 2) of a modified form of full-face mask.

Fig. 11 is a fragmentary, horizontal section thru one side of said full-face mask, taken on line 11—11 Fig. 10.

Fig. 12 is another fragmentary, horizontal section thru one side of said full-face mask, taken on line 12—12 Fig. 10.

Fig. 13 is a fragmentary and substantially vertical section thru the full-face mask of Figs. 10–13, taken on line 13—13 Fig. 12.

Fig. 14 is a fragmentary, horizontal section similar to Fig. 12, but thru one side of still another modified form of full-face mask.

Figure 1:
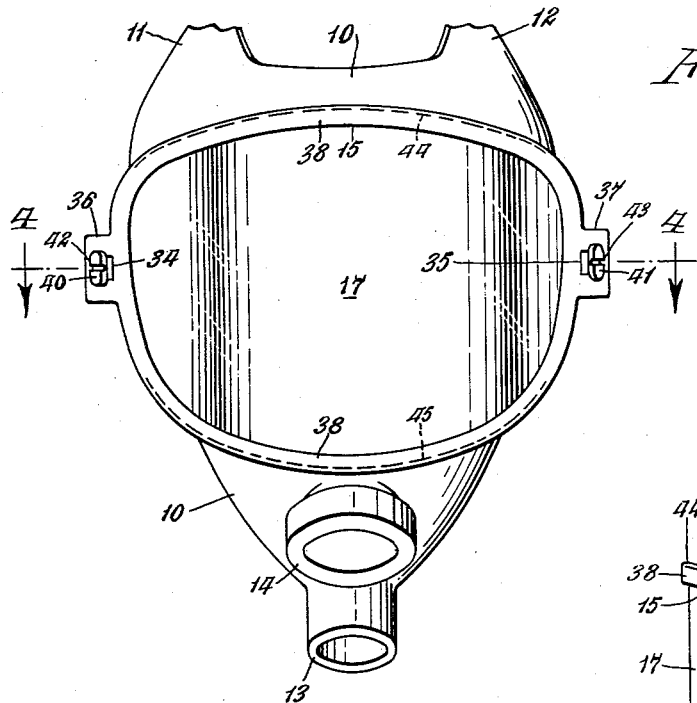
Fig. 1 is a diminutive, front elevation of a full-face mask equipped with my invention.

The invention will here be described exactly as it is here illustrated, but it is to be understood that the breadth of the invention is not circumscribed by the particular form of the invention here disclosed but is to be limited only by the scope of the invention and by the breadth of the appended claims.

The full-face rubber mask body 10 is equipped with the usual head straps 11 and 12, inlet tube 13 and exhalation fitting 14. Said mask body 10 is formed to provide on its front face an approximately oval or elliptical opening 15 which is suitably molded to provide an inwardly-opening groove or rabbet 16 in which is received the periphery of the curvilinear, clear-plastic lens 17 whose geometrical shape or form is that of a portion of a hollow cylinder generated about a vertical axis. The purpose of thus shaping the lens 17 is to permit the wearer of the mask to fully employ his peripheral vision when looking straight ahead, and also to permit unimpeded vision when rolling his eyes to one side or the other.

Cemented to the inner face of the mask body 10 adjacent the oval opening 15 is a stiff, sheet-metal, oval backing plate 18 whose periphery is preferably received within a curvilinear groove 20 which is suitably molded in said mask body 10. This backing plate 18 is of curvilinear form, corresponding to the shape of the lens 17, and, for convenience, the two extreme, horizontal, terminal portions of said backing plate 18 will be referred to as the "ends" of said backing plate.

The opposite "ends" of said backing plate 18 are provided with integral ears 21, 22 (see Figs. 9, 4 and 6) which are medially pierced at 23, 24 to receive the pivot pins 25, 26 that are formed integrally and concentrically on the inner faces of the hubs of the eccentrics 27, 28. The inner ends of these pivot pins are rivetted over, as shown, to prevent disengagement of their companion eccentrics 27, 28 from the backing plate 18. The cylindrical hubs of the eccentrics 27, 28 are snugly received within suitable friction holes 30, 31 which are molded in the mask body 10, this construction provided a frictional resistance between the eccentrics 27, 28 and the mask body 10 for reason which will be presently described.

Formed integrally on the front or outer face of the eccentrics 27, 28 are companion eccentric pins 32, 33 which are slidably received within a pair of companion flat-sided slits 34, 35 that are formed in the ears 36, 37 of the oval sheet-metal, tension band 38. The outer ends of said eccentric pins 32, 33 terminate in companion, flat-sided, adjustment heads 40, 41, the reason for the latter having a flat sided shape being to permit the slots 34, 35 of the tension band 38 to be slipped over said flat-sided heads 40, 41 when the latter are turned 90° from the position shown in the drawings. Screw driver slots 42, 43 are preferably formed in the outer faces of said flat-sided, adjustment heads 40, 41 to facilitate their being turned.

This construction provides an eccentric connection between each end of the tension band 38 and the companion end of the backing plate 18, whereby, when the eccentrics 27, 28 are turned, the opposite ends of said tension band 38 are drawn tightly around the outer face of the opening 15 of the mask body 10. This effects a fluid-tight connection between the lens 17 and the mask body 10.

Figure 2:
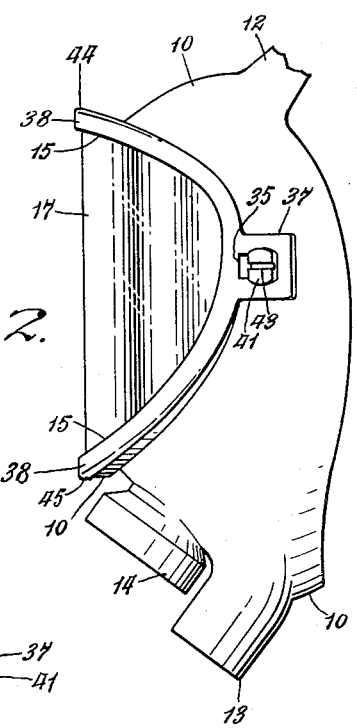
Fig. 2 is a diminutive, side elevation thereof.
Figure 3:
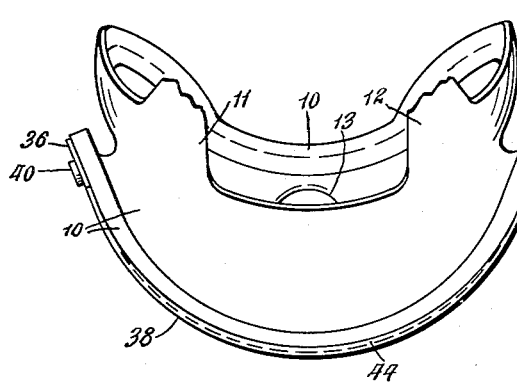
Fig. 3 is a diminutive, top plan of said full-face mask.

The tension band 38 is subjected to a certain degree of lateral stress which is apt to curl it up if not properly compensated for, and this compensation is obtained by providing the outer edges of upper and lower portions of the tension band with integral, stiffening flanges 44, 45 which (see Figs. 3 and 2) are relatively wide at their central portions (where the lateral stress is greatest) and are relatively narrow at their end portions (where the lateral stress is small), and tapering off to zero adjacent the ears 36, 37.

After the eccentrics 27, 28 have been adjustably turned to approximately the position shown in the drawings (so as to tighten the lens 17 in the mask body 10), said eccentrics are frictionally restrained from getting out of adjustment by reason of the frictional engagement of their hubs with the friction holes 30, 31 of the rubber, mask body 10.

One modified form of the invention is shown in Figs. 10 thru 13. In this construction the backing plate 18a is not imbedded in the inwardly-opening groove or rabbet 20 of Fig. 7, but merely lies against and is preferably cemented to the inner face of the U-shaped, annular flange 46 which encircles the dual-curved periphery of the lens 17a and forms an integral part of the rubber, full-face, mask body 10a. In this construction the backing plate 18a is provided throughout its entire periphery with a radially outwardly-extending peripheral flange 47 which bears against the laterally-outward, peripheral face of the mask flange 46. The backing-plate flange 47 stiffens the backing plate 18a and also properly "locates" said backing plate relatively to the mask body 10a.

The sheet-metal, tension band 38a is provided with an upper flange 44a and a lower flange 45a. Both of these flanges 44a and 45a, prevent lateral distortion of the central part of the tension band 38a as it is being tensioned, and both flanges may, if desired, fade out to zero hear the outer ends of said tension band 38a in the manner shown in Figs. 1 thru 9.

The outer ends of the backing plate 18a are provided with a pair of integral, sheet-metal brackets 50 each of which is stiffened by a pair of integral gusset plates 51. The outer portion of each bracket 50 is drilled to rotatably accommodate the shank of a tension screw 52. The stem of said tension screw is threaded thru a tapped hole which is tapped centrally in a draw block 53, the latter being welded to the rear, central surface of a companion, rectangular ear 37a which projects integrally rearwardly and outwardly from each end of the tension band 38a. Thus, as the two tension screws 52 are tightened, the tension band 38a is tightly "wrapped around" the outer face of the mask flange 46 and hence said flange and the lens 17a tightly but detachably clamped to the backing plate 18a and thereby to the whole mask body 10a. When the lens 17a is to be replaced, the tension screws 52 are screwed clear out of their companion draw blocks 53 and then slipped clear out of their companion brackets 50 after which the tension band 38a may be pulled off forwardly and the to-be-replaced lens 17a removed and replaced.

Another modified and simplified form of the invention is shown in Fig. 14. In this case, instead of the U-shaped flange 46 of Figs. 10–13, a plain flange 46b is employed to the rear face of which is cemented the backing plate 18b. The tension band 38b is similar to the tension band 38a of Figs. 10–13, but in this case rests directly on the front peripheral edge of the lens 17b itself.

I claim:

1. A face mask comprising: a mask body having a lens opening; a lens mounted in said opening and bearing with its rear face against said mask body; a tension band having an inner and an outer edge, and a flange on its outer edge which flange is relatively wide at the center of said tension band and is relatively narrow at the ends of said tension band, said tension band being arranged on said mask body adjacent the periphery of said lens and bearing against the front face of said lens; and means for radially pulling the opposite sides of said tension band relatively to said mask body, this pulling force being exerted in a direction which is parallel to a flat plane that is tangential to the surface of said lens.

2. A face mask comprising: a mask body having a lens opening; a lens mounted in said opening and bearing with its rear face against said mask body; a tension band arranged on said mask body adjacent the periphery of said lens, and bearing against the front face of said lens, and having a flange extending around its entire periphery with said flange abutting an adjacent portion of the mask body; and means for radially pulling the opposite sides of said tension band relatively to said mask body, this pulling force being exerted in a direction which is parallel to a flat plane that is tangential to the surface of said lens.

References Cited in the file of this patent

UNITED STATES PATENTS

| 1,595,908 | Miller | Aug. 10, 1926 |
| 2,367,389 | Ditto | Jan. 16, 1945 |
| 2,526,181 | Wilen | Oct. 17, 1950 |
| 2,537,265 | Gemunden | Jan. 9, 1951 |
| 2,665,686 | Wood et al. | Jan. 12, 1954 |